(12) United States Patent
Olver

(10) Patent No.: US 8,231,142 B2
(45) Date of Patent: Jul. 31, 2012

(54) FLUID CONDUIT COUPLING WITH LEAKAGE DETECTION

(75) Inventor: Bryan W. Olver, Nobleton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 664 days.

(21) Appl. No.: 12/372,017

(22) Filed: Feb. 17, 2009

(65) Prior Publication Data
US 2010/0207379 A1 Aug. 19, 2010

(51) Int. Cl.
*F16L 41/08* (2006.01)
*F16L 5/02* (2006.01)

(52) U.S. Cl. ........... 285/93; 285/13; 285/61; 285/139.2; 285/142.1; 285/205; 285/368; 60/226.1; 60/797

(58) Field of Classification Search .... 285/139.1–139.3, 285/13, 14, 93, 141.1, 142.1, 205, 368; 60/226.1, 60/797
See application file for complete search history.

(56) References Cited

U.S. PATENT DOCUMENTS

| | | | |
|---|---|---|---|
| 2,149,906 A * | 3/1939 | Bell | 285/202 |
| 2,414,509 A * | 1/1947 | Crot | 248/56 |
| 2,949,734 A * | 8/1960 | Bertin et al. | 285/410 |
| 3,084,849 A | 4/1963 | Dennison | |
| 3,106,061 A * | 10/1963 | Eder | 239/265.15 |
| 3,312,448 A | 4/1967 | Hull, Jr. et al. | |
| 4,019,371 A * | 4/1977 | Chaplin et al. | 73/46 |
| 4,183,207 A | 1/1980 | Libertini | |
| 4,288,105 A * | 9/1981 | Press | 285/55 |
| 4,422,675 A * | 12/1983 | Norris et al. | 285/45 |
| 4,478,551 A | 10/1984 | Honeycutt, Jr. et al. | |
| 4,828,296 A * | 5/1989 | Medvick | 285/139.1 |
| 4,979,872 A | 12/1990 | Myers et al. | |
| 4,987,736 A | 1/1991 | Ciokajlo et al. | |
| 5,197,766 A * | 3/1993 | Glover et al. | 285/14 |
| 5,261,240 A * | 11/1993 | Oyler et al. | 60/734 |
| 5,263,312 A * | 11/1993 | Walker et al. | 60/797 |
| 5,483,792 A | 1/1996 | Czachor et al. | |
| 5,505,498 A * | 4/1996 | Halling et al. | 285/111 |
| 5,609,467 A | 3/1997 | Lenhart et al. | |
| 5,746,574 A | 5/1998 | Czachor et al. | |
| 5,771,696 A | 6/1998 | Hansel et al. | |
| 6,109,663 A * | 8/2000 | Hayton | 285/272 |
| 6,299,216 B1 * | 10/2001 | Thompson | 285/93 |
| 6,358,001 B1 | 3/2002 | Bosel et al. | |
| 6,439,616 B1 * | 8/2002 | Karafillis et al. | 285/205 |
| 6,942,452 B2 | 9/2005 | Bruno et al. | |
| 7,278,516 B2 | 10/2007 | Zalewski et al. | |
| 7,377,100 B2 | 5/2008 | Bruno et al. | |
| 7,523,965 B2 * | 4/2009 | Masarwa | 285/139.2 |

(Continued)

*Primary Examiner* — James Hewitt
(74) *Attorney, Agent, or Firm* — Norton Rose Canada LLP

(57) ABSTRACT

A fluid conduit coupling for a turbofan engine wherein the engine has a gas path defined by inner and outer duct walls and the exterior surface of the outer duct wall is readily accessible for visual inspection. In one example, a first fluid line extends across the gas path between the inner and outer duct walls and a second fluid line is connected to the first fluid line at the level of the outer duct wall. The first fluid line may include a female coupling member and the second fluid member may include a mating male coupling member. An annular sealing member is associated with the first and second couplings and a leak path is defined between the annular sealing member and the exterior surface of the outer duct wall, whereby fluid may be detected by visual inspection of the outer duct wall if a leak should occur at the annular sealing member.

5 Claims, 6 Drawing Sheets

U.S. PATENT DOCUMENTS

| | | | |
|---|---|---|---|
| 7,942,452 B2 * | 5/2011 | Carns et al. | 285/93 |
| 2005/0062283 A1 * | 3/2005 | Hawkinson et al. | 285/139.1 |
| 2008/0150279 A1 * | 6/2008 | Statham et al. | 285/139.1 |
| 2008/0246276 A1 * | 10/2008 | Bravo et al. | 285/139.2 |

* cited by examiner

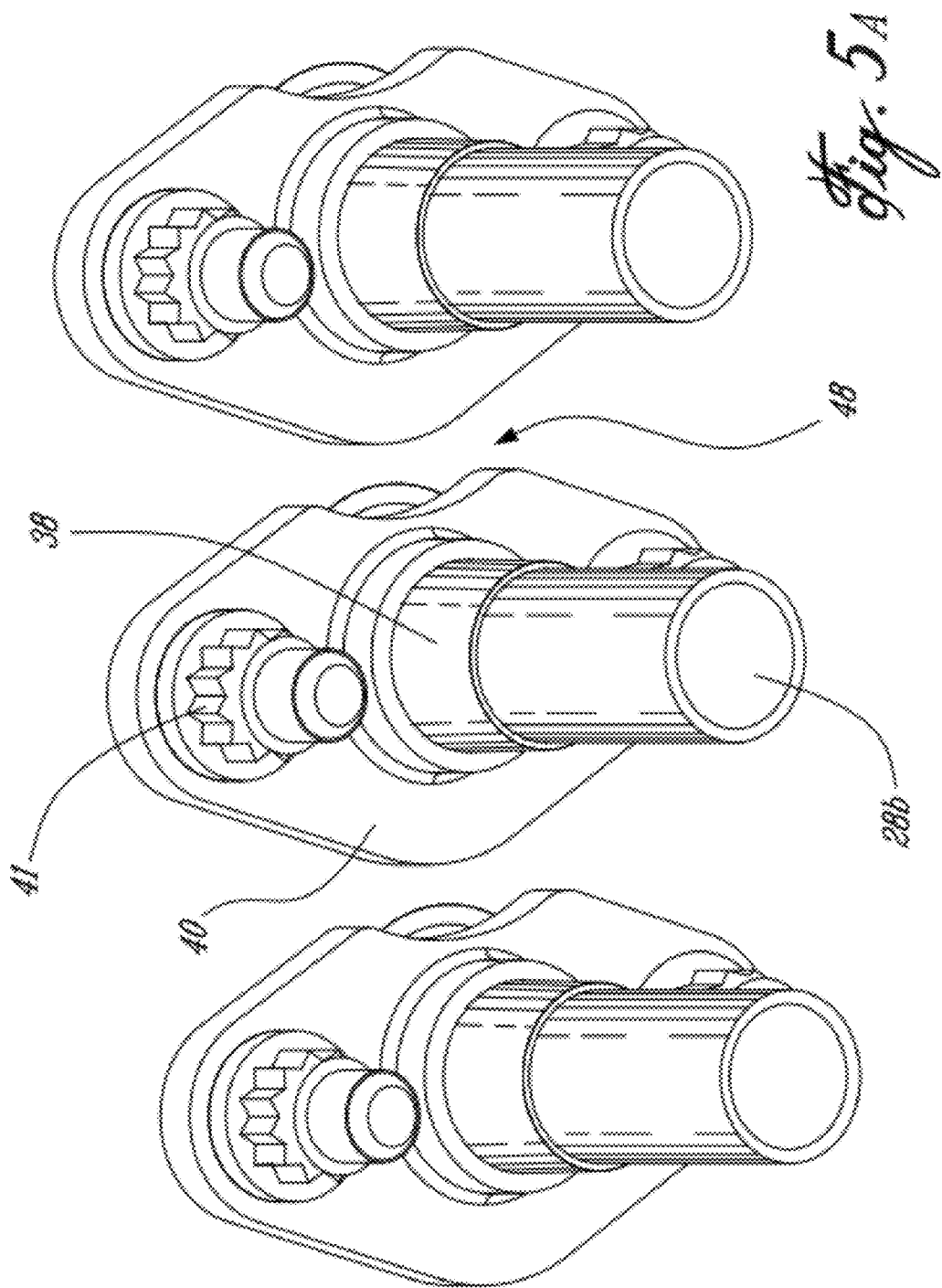

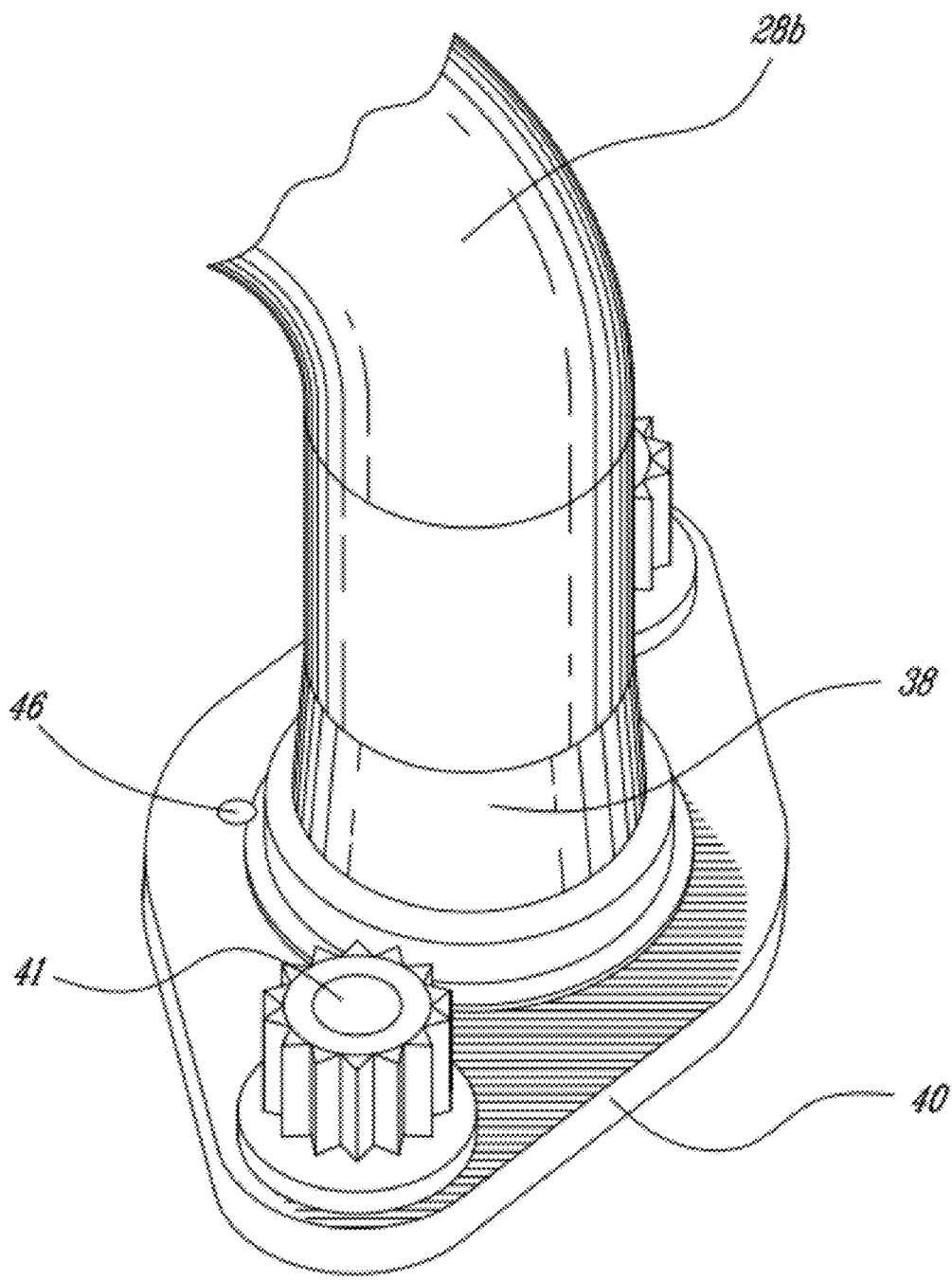

FLUID CONDUIT COUPLING WITH LEAKAGE DETECTION

TECHNICAL FIELD

The application relates generally to fluid conduit couplings and, more particularly, to fluid conduit for a turbofan gas turbine engine.

BACKGROUND OF THE ART

The gas path of a turbofan engine generally comprises one or more annular ducts through which high pressure air is passed. The fuel/oil conduit or line of the engine passes across the gas path. The fuel/oil line passing across the gas path is generally coupled to a fuel/oil feed line on the exterior of the duct.

The coupling between the fuel/oil feed line and the line traversing the gas path has a seal to prevent leakage. It is customary to create a double seal inside the gaspath in order to guarantee that leakage does not occur. However, double seals are not foolproof and leakage can still occur. If the fluid leaks into the gas path it can go undetected for sometime. In some examples, the double seal arrangement requires a massive bulkhead portion to accommodate the male coupling of each conduit segment each with a seal, providing an added weight factor.

Accordingly, there is a need to provide an improved arrangement for transferring fuel or oil across the gas path in a turbofan engine.

SUMMARY

In one aspect of the present disclosure, there is thus provided a fluid conduit coupling arrangement for a turbofan engine comprising a gas path defined by a bypass duct having inner and outer bypass duct walls, the outer bypass duct wall having an exterior surface readily accessible for visual inspection of the engine before installation on an aircraft, a first fluid line extending across the gas path between the inner and outer duct walls, a second fluid line connected to the first fluid line at the level of the outer bypass duct wall, the first and second fluid lines having mating female and male coupling members; an annular sealing member associated with the male and female coupling members, and a leak path defined between the annular sealing member and the exterior surface of the outer bypass duct wall, whereby leakage fluid may be detected by visual inspection of the outer duct wall when conducting a visual leak check of the engine if a leak should occur at the annular sealing member.

In a second aspect, there is provided a liquid-fluid leak detection system for a turbofan engine including a coupling in a liquid-fluid conduit traversing a bulkhead wherein the bulkhead has one surface that is readily available for visual inspection prior to being installed on an aircraft, the coupling having a female coupling member open at the one surface of the bulkhead and a male coupling member insertable into the female coupling member, and an annular seal provided between the male and female coupling members to render the coupling liquid tight when the coupling is assembled, and a liquid leak path defined between the female and the male coupling members from the annular seal to the one surface wherein a liquid-fluid leak may be detected visually at the one surface of the bulkhead.

In a third aspect, there is provided a method of detecting a leak in a sealed coupling joining liquid conduit components in a turbofan engine comprising a bulkhead through which the liquid conduit passes and the bulkhead has a surface that is readily available for visual inspection; the method including the steps of: providing the coupling with a female coupling member open to the surface available for visual inspection, inserting a male coupling member in the female coupling member with an annular liquid seal located between the female and male coupling members, and creating a liquid path in the coupling from the annular seal to the surface of the bulkhead that is available for visual inspection so that in case of a breach of the seal the liquid will readily leak to the surface where the leak can be readily detected.

DESCRIPTION OF THE DRAWINGS

Reference is now made to the accompanying figures, in which:

FIG. 5a is an enlarged fragmentary perspective view looking inwardly at the gas path duct wall, showing a further detail of the coupling assembly; and FIG. 5b is an enlarged fragmentary perspective view similar to FIG. 5a showing another embodiment thereof.

DETAILED DESCRIPTION

Figure 1:
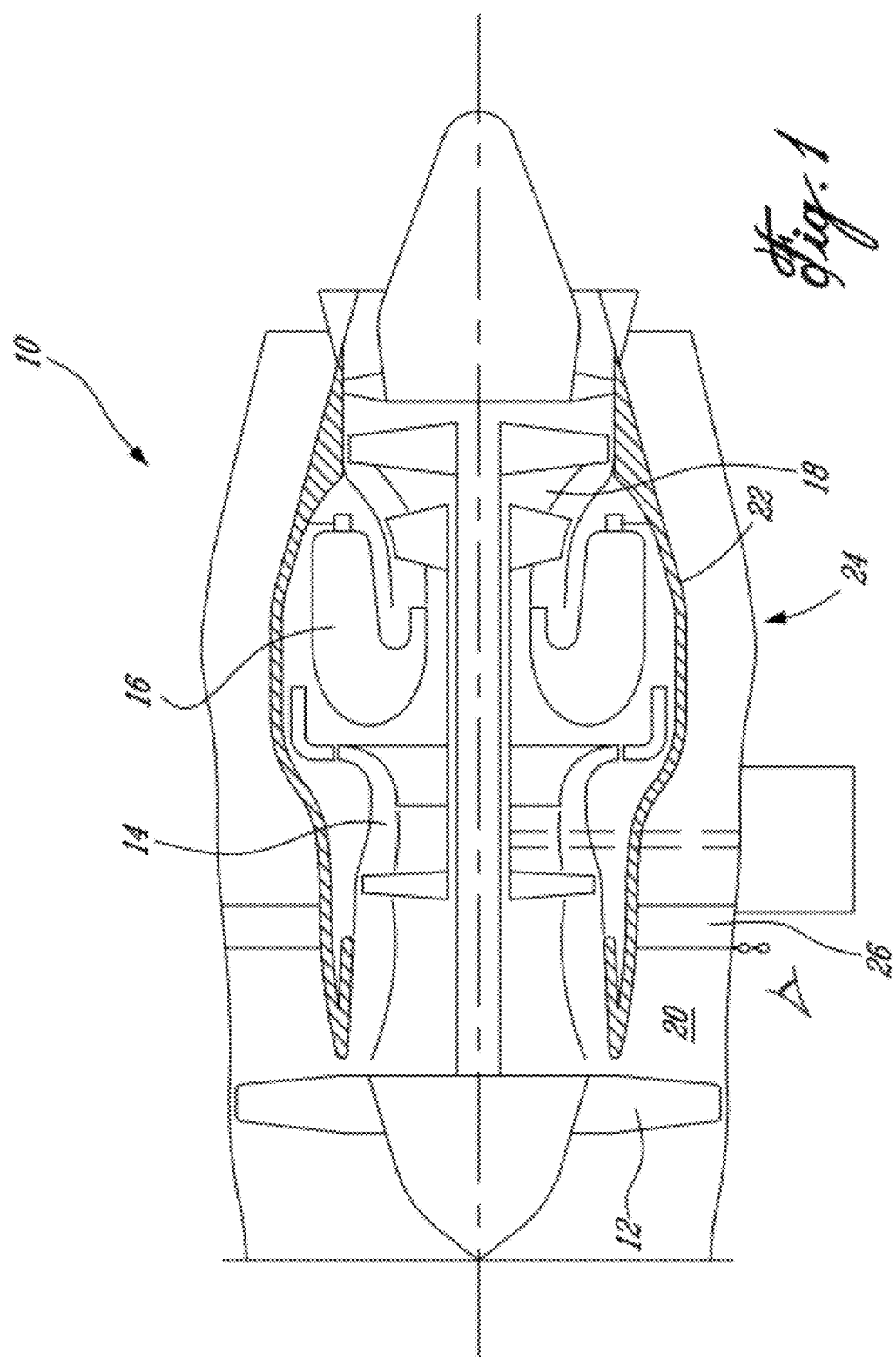
FIG. 1 is a schematic cross-sectional view of a turbofan gas turbine engine including one embodiment of the coupling assembly on a fuel line shrouded within a fairing.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
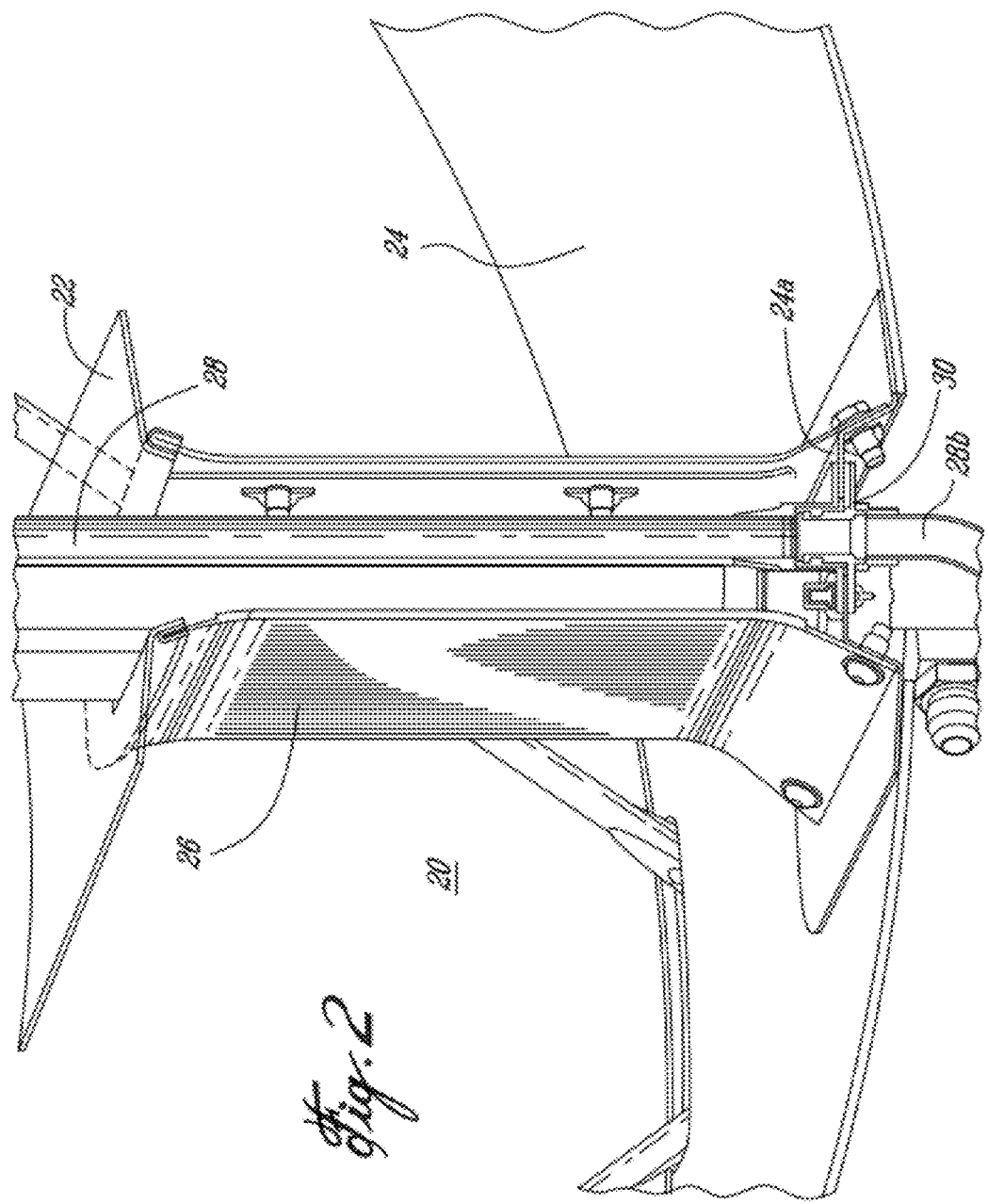
FIG. 2 is a is a fragmentary perspective view of FIG. 1, showing a gas path in the turbofan engine with a detail of one embodiment of the coupling assembly on a fuel line shrouded within a fairing.
Figure 3:
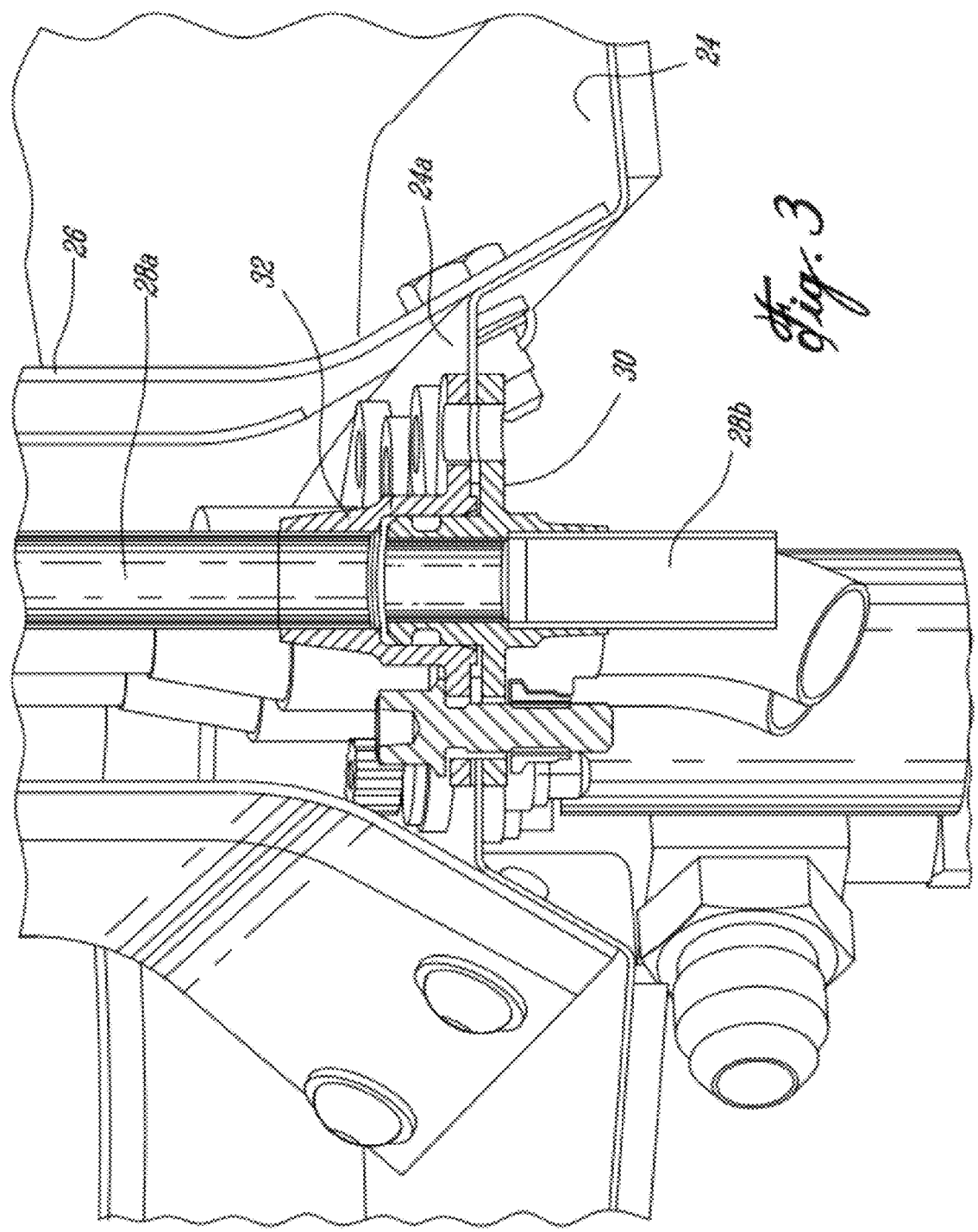
FIG. 3 is an enlarged fragmentary perspective view similar to FIG. 2 showing the coupling assembly in greater detail.

FIG. 2 shows somewhat schematically a gas path 20, such as the bypass duct of the turbofan engine 10, defined by inner duct wall 22 and outer bypass duct wall 24. The outer bypass duct wall 24 forms a firewall. Generally when fluid lines extend across the gas path 20, fairings are provided. In this case, a fairing 26 extends between the bypass duct walls 22 and 24 and shrouds various fluid and utility lines as shown in FIGS. 2 and 3. The fluid line 28 may be a fuel line or oil line. It includes segmented tubular conduits that are generally joined at the bulkhead formed at the outer bypass duct wall 24.

The embodiments shown in FIGS. 2 through 5a and 5b include a lightweight bulkhead 24a (FIG. 3) fixed to the outer bypass duct wall 24. This configuration is lightweight in comparison to the more bulky prior art fairings which have been used. The fairing 26 is bolted securely to the bulkhead 24a. A typical fuel or oil line 28 includes segments 28a and 28b joined at a coupling 30. The coupling 30 is coincident with the bulkhead 24a. Bulkhead 24a, forming part of the outer bypass duct wall 24, is generally available for visual inspection from the outside of the engine.

Figure 4:
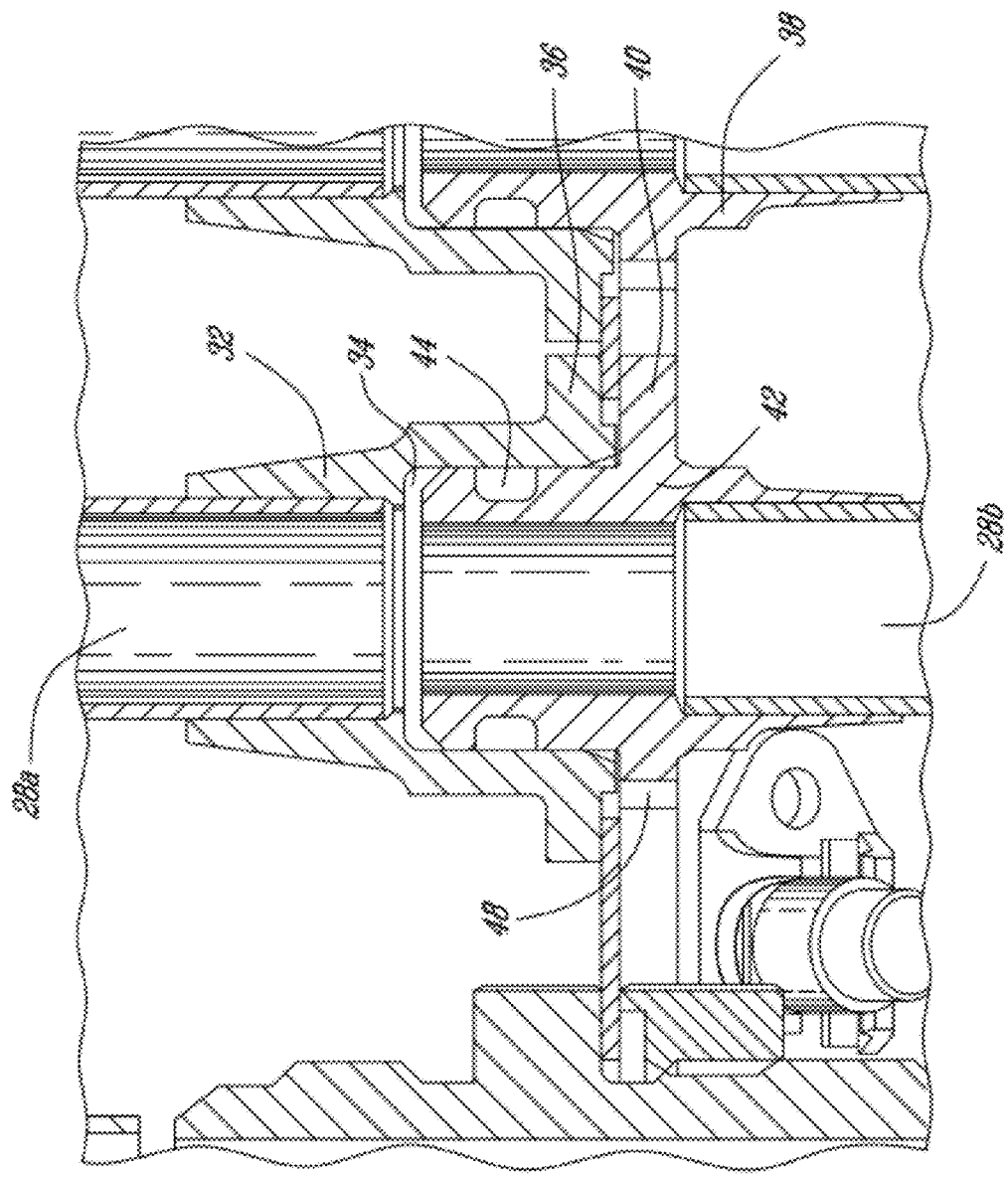
FIG. 4 is an enlarged radial cross section taken through line 4-4 in FIG. 3.

As shown in FIG. 4, the coupling 30 includes a female coupling member 32 and a male coupling member 38. The female coupling member 32 is affixed by swaging, welding, or brazing to the end of the conduit 28a while the male coupling member 38 is fixedly connected to the end of the tubular conduit 28b. The female coupling member 32 includes a central recess 34 adapted to loosely receive the concentric wall 42 of the male coupling member 38. The male coupling member 38 includes an O-ring seat 43 adapted to receive an O-ring 44 which acts as a seal when the male coupling member 38 is inserted into the female coupling member 32.

As can be seen in FIG. 4, there is a leakage path provided between the concentric wall 42 and the surface forming the recess 34 towards the exterior of the outer bypass duct wall 24. The male coupling member includes a flange 40 as shown in FIGS. 5a and 5b to allow the coupling member 30 to be fixed to the bulkhead by way of bolts 41.

In one embodiment as shown in FIG. 5a the flange 40 is scalloped at 48 and allows the leak path to communicate with the exterior of the bulkhead 24a. Therefore, if there is a breach in the seal 44, the fluid such as fuel will take the path of least resistance and follow the leak path through the opening 48 formed by the scallop in the flange 40. Thus, if there is a breach in the seal 44, the fluid will leak to the outside of the bypass duct or nacelle rather than the undetectable side inside the gas path where fluid would either be lost to the air in the gas path or would simply accumulate. Should a seal failure occur in flight, nacelles are protected from fluid accumulation by strategically placed drains which are in fact verified by flight tests during aircraft certification. This precludes the danger of excess fluid accumulating inside the nacelle.

In another embodiment as shown in FIG. 5b a small deadhead hole 46 is formed in the flange 40 providing the fluid leak path to the exterior of the bypass duct for visual inspection purposes.

Statistically most seal failures occur on installation. A leak check of the engine is conducted in the test cell and therefore if a fuel leakage occurs at the coupling 30 it will leak to the outer surface of the outer bypass duct wall 24 and will be visible to the person conducting the leak test. However, once the engine is mounted on the fuselage or wing any leakage will drip to the bottom of the nacelle and be visible on the exterior of the nacelle near the drains. Thus a pilot or maintenance person will be able to detect leakage on the ramp by visually inspecting the outer surface of the nacelle.

The flange 36 and flange 40 are clamped to the bulkhead 24A and retained by bolts and nuts 41. Some of the advantages flowing from this coupling assembly are fewer parts and a reduction in mass of the bulkhead as compared to other bypass ducts incorporating fluid line couplings.

The above description is meant to be exemplary only, and one skilled in the art will recognize that changes may be made to the embodiments described without departing from the scope of the invention disclosed. Other modifications which fall within the scope of the present invention will be apparent to those skilled in the art, in light of a review of this disclosure, and such modifications are intended to fall within the appended claims.

What is claimed is:

1. A fluid conduit coupling arrangement in combination with a turbofan engine comprising a gas path defined by a bypass duct having inner and outer bypass duct walls, the outer bypass duct wall forming a firewall and having an exterior surface readily accessible for visual inspection of the engine before installation on an aircraft; the arrangement comprising: a first fluid line extending across the gas path between the inner and outer duct walls; a second fluid line extending outside of the engine; a bulkhead coupling connecting the first and second fluid lines in flow communication, the bulkhead coupling having mating female and male coupling members; the male and female coupling members being clamped to said firewall; an annular sealing member provided between the male and female coupling members, and a leak path defined between the annular sealing member and the exterior surface of the outer bypass duct wall, the leak path extending through the firewall, whereby leakage fluid may be detected by visual inspection of the outer duct wall when conducting a visual leak check of the engine if a leak should occur at the annular sealing member.

2. The combination defined in claim 1, wherein the first fluid line is shrouded in a fairing extending across the gas path.

3. The combination defined in claim 1, wherein the female coupling member and the male coupling member have flanges to be clamped to the firewall, the firewall being sandwiched between the flanges of the female and male coupling members.

4. The combination defined in claim 3, wherein at least the flange formed on the male coupling member includes a leak path passage to allow fluid leakage to pass to the exterior of the outer bypass duct wall.

5. The combination defined in claim 1, wherein the turbofan engine when installed on an aircraft is within a nacelle and the firewall is no longer visible; the nacelle has drains for fluid leakage and any fluid leakage occurring at the firewall will drip to the bottom of the nacelle where it will be visually detectable on the outside of the nacelle near the drains by a person inspecting the nacelle for leaks.

\* \* \* \* \*